Jan. 9, 1951 J. M. HAUSER 2,537,826
STAND
Filed March 22, 1949
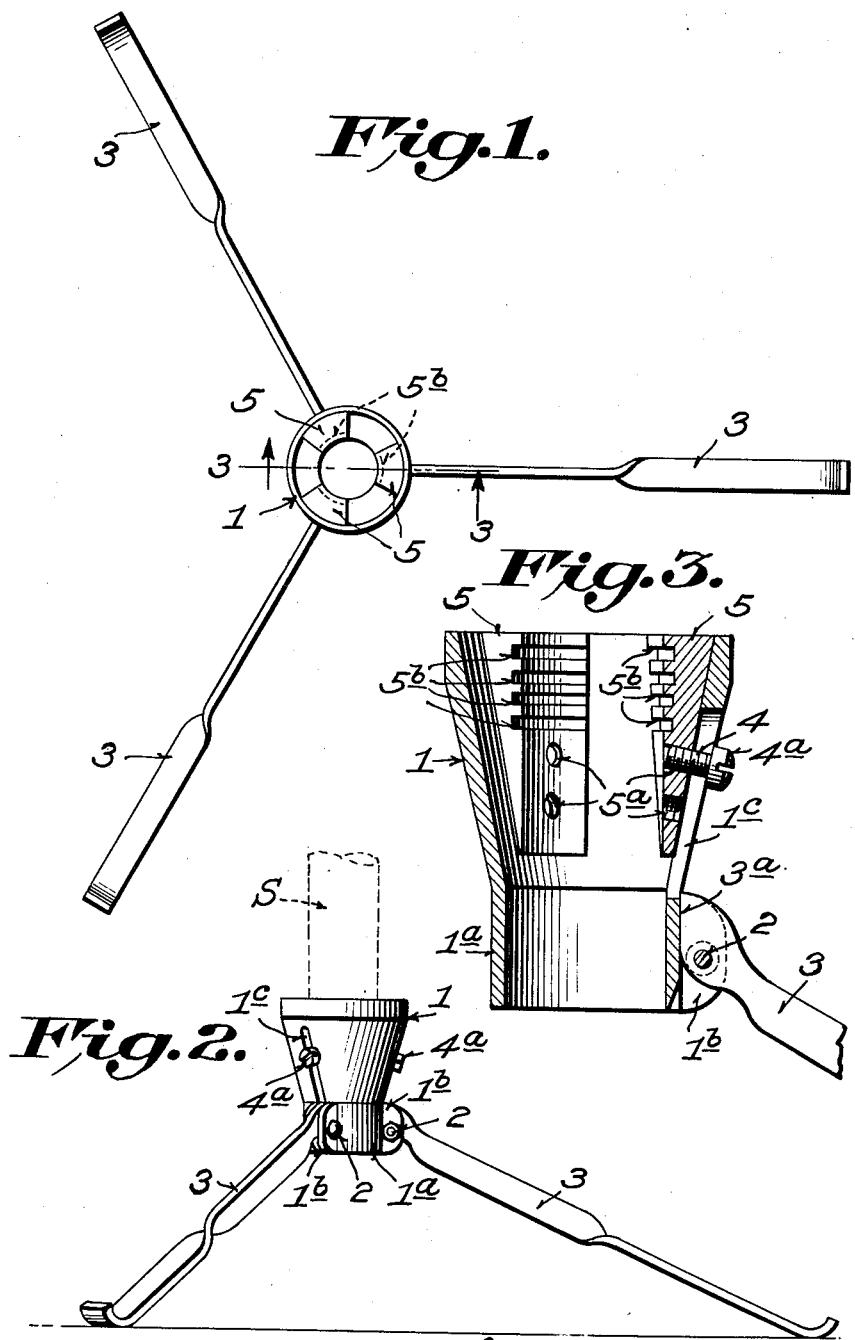
INVENTOR.
John M. Hauser
BY
Alexander Powell
ATTORNEYS Patented Jan. 9, 1951

2,537,826

UNITED STATES PATENT OFFICE 2,537,826

STAND

John Maria Hauser, Takoma Park, Md., assignor to House of Modern Medical Appliances Company, Takoma Park, Md., a firm Application March 22, 1949, Serial No. 82,729

6 Claims. (Cl. 248—44)

This invention is a novel improvement in portable stands adapted to support in vertical position rods or staffs such as Christmas trees, flags, or the like; and the principal object thereof is to provide a stand adapted to receive the lower end of the staff or the like and to securely maintain same in upright position, the stand being adjustable within a relatively wide range to receive the staffs or the like of various diameters.

Another object of the invention is to provide a stand or the like which will be simple, novel and efficient, and inexpensive to manufacture.

Other minor objects of the invention will be hereinafter set forth.

I will explain the invention with reference to the accompanying drawing, which illustrates one practical embodiment thereof, to enable others familiar with the art to adopt and use the same; and will summarize in the claims, the novel features of construction, and novel combinations of parts, for which protection is desired.

In said drawing:

Figure 1 is a top plan view of the stand.

Fig. 2 is a side elevation thereof, indicating in dotted lines a staff supported thereby.

Fig. 3 is an enlarged section on the line 3—3, Fig. 1.

As shown, the stand preferably comprises a conical casing 1, of metal, plastic or the like, same increasing upwardly in diameter and having a cylindrical extension 1a at its lower or smaller end. Disposed around the exterior of the cylindrical portion 1a are pairs of spaced ears 1b which are perforated to receive the hinge pins 2 of pivoted legs 3, said legs being adapted to engage the floor or other support, and being preferably spaced 120° apart around the exterior of casing 1, as shown in Fig. 1, although four or more legs spaced equidistantly apart might be used if desired. The upper ends of legs 3 above the pivots 2 are provided with shoulders 3a (Fig. 3) adapted to engage the outer wall of extension 1a to limit the outward pivotal movement of the legs. The use of the three legs 3 insures that the stand will always rest squarely upon the floor or other support.

In the sides of the casing 1, preferably disposed opposite each of the pairs of ears 1b are slots 1c (Figs. 2 and 3) disposed axially to the casing, through which slots extend the shanks of set screws 4 having heads 4a of larger diameter than the width of the slots 1c, said set screws 4 being adapted to enter tapped holes 5a in slides 5 which engage the inner conical walls of the casing 1, two or more such tapped holes 5a being provided in each slide 5 whereby the slides may be further adjusted vertically within the casing 1 to accommodate the staffs S of various diameters. The inner faces of the slides 5 are preferably arcuate in shape, the same being curved on a radius substantially concentric with the axis of the casing 1, as shown in Fig. 1; also the inner faces taper oppositely from the walls of the conical casing 1 so that the opening between the slides 5 increases downwardly of the casing 1, as clearly shown in Fig. 3.

In the upper portion of each slide 5 is a series of annular grooves 5b, four being shown in Fig. 3, thereby forming serrations adapted to grip the trunk of the tree or staff S held in the stand.

By the above construction, when inserting a staff in the casing 1 the screws 4 would be normally loosened so that the slides 5 may be shifted vertically with respect to the casing, the slides forming therebetween a substantially circular opening. When the slides 5 are thus elevated, the staff S would be placed within the opening between the slides, and the slides then lowered with respect to the casing 1, and when the staff has been adjusted to vertical position the screws 4 may then be tightened so as to securely lock the staff S in place.

In Fig. 3, the screws 4 are shown as engaged in the uppermost tapped holes 5a of the slides. Obviously, the screws may be engaged with the lowermost tapped holes 5a, thereby permitting the slides 5 to be shifted upwardly a greater distance relatively of the casing 1 to receive a staff S of larger diameter than that receivable when the screws 4 engage the uppermost tapped bores 5a.

My novel stand provides ample adjustability for receiving staffs of trunks of various diameters; and by use of the double taper, i. e. the taper of the walls housing 1 and the opposite taper of the inner faces of the slides 5, the staff or trunk S will be securely held or gripped by the grooves 5b of the slides in the stand and prevented from tilting.

When not in use the legs 3 may obviously be pivoted downwardly so as to permit storage of the stand in a relatively small space no larger in diameter than the diameter of the larger end of the casing 1.

I do not limit my invention to the exact form shown in the drawing, for obviously changes may be made therein within the scope of the claims.

I claim:

1. A stand for supporting staffs or the like in upright position comprising a casing having a conical bore increasing upwardly in diameter; a plurality of legs secured to the casing; a plurality of axially disposed slots in the casing; a plurality of slides within the casing opposite the respective slots; and headed screws having shanks passing through the slots and into tapped holes in the slides; the inner faces of the slides tapering in the opposite direction from the bore of the casing.

2. In a stand as set forth in claim 1, a series of pairs of perforated ears on the casing disposed equidistantly apart; said legs being pivoted in said pairs of ears respectively; and said legs having shoulders at their upper ends adapted to contact the outer face of the casing to limit the outward pivotal movement of the legs.

3. In a stand as set forth in claim 1, said slides having vertical series of tapped holes therein for receiving the said screws.

4. A stand for supporting staffs or the like in upright position comprising a casing having a conical bore increasing upwardly in diameter; a plurality of legs secured to the casing; a plurality of axially disposed slots in the casing; a plurality of slides within the casing opposite the respective slots; and headed screws having shanks passing through the slots and into tapped holes in the slides; the inner faces of the slides tapering in the opposite direction from the walls of the casing and having a series of transverse grooves therein.

5. A stand for supporting staffs or the like in upright position comprising a conical casing increasing upwardly in diameter and having a cylindrical extension at its lower end; a plurality of legs secured to the extension; a plurality of axially disposed slots in the casing above the extension; a plurality of slides within the casing opposite the respective slots; and headed screws having shanks passing through the slots and into tapped holes in the slides; the inner faces of the slides tapering in the opposite direction from the walls of the casing and having a series of transverse grooves therein.

6. In a stand as set forth in claim 5, a series of pairs of perforated ears on the extension disposed equidistantly apart; said legs being pivoted in said pairs of ears respectively; and said legs having shoulders at their upper ends adapted to contact the outer face of the extension to limit the outward pivotal movement of the legs

JOHN MARIA HAUSER.

REFERENCES CITED

The following references are of record in the file of this patent:

UNITED STATES PATENTS

| Number | Name | Date |
| --- | --- | --- |
| 594,491 | Silverman | Nov. 30, 1897 |